US011205064B1

United States Patent
Chu et al.

(10) Patent No.: US 11,205,064 B1
(45) Date of Patent: Dec. 21, 2021

(54) MEASURING QUALITY OF DEPTH IMAGES IN REAL TIME

(71) Applicant: Google LLC, Mountain View, CA (US)

(72) Inventors: Wen-Sheng Chu, Menlo Park, CA (US); Sam Ekong, Mountain View, CA (US); Kuntal Sengupta, Mountain View, CA (US)

(73) Assignee: Google LLC, Mountain View, CA (US)

(*) Notice: Subject to any disclaimer, the term of this patent is extended or adjusted under 35 U.S.C. 154(b) by 3 days.

(21) Appl. No.: 16/901,564

(22) Filed: Jun. 15, 2020

(51) Int. Cl.
  *G06K 9/00* (2006.01)
  *G01B 11/22* (2006.01)
  *G06K 9/46* (2006.01)

(52) U.S. Cl.
  CPC .......... *G06K 9/00288* (2013.01); *G01B 11/22* (2013.01); *G06K 9/00201* (2013.01); *G06K 9/00275* (2013.01); *G06K 9/4604* (2013.01)

(58) Field of Classification Search
  CPC .... G06K 9/4604; G06K 9/00; G06K 9/00288; G06K 9/00275; G06K 9/00201; G01B 11/25; G01B 2210/52; G01B 11/22
  See application file for complete search history.

(56) References Cited

U.S. PATENT DOCUMENTS

| | | | | |
|---|---|---|---|---|
| 2004/0096098 A1* | 5/2004 | Love | ........................ | G06K 9/00 382/154 |
| 2005/0123191 A1* | 6/2005 | Zhang | ...................... | G06K 9/32 382/154 |
| 2016/0167226 A1* | 6/2016 | Schnittman | .......... | G05D 1/0274 382/153 |
| 2017/0039756 A1* | 2/2017 | Moule | ...................... | H04N 5/74 |
| 2017/0103509 A1* | 4/2017 | Scharfenberger | .... | H04N 17/002 |

OTHER PUBLICATIONS

The HCI Stereo Metrics: Geometry-Aware Performance Analysis of Stereo Algorithms (Year: 2015).*
NIQSV: A No Reference Image Quality Assessment Metric for 3D Synthesized Views (Year: 2017).*
Blind Depth Quality Assessment Using Histogram Shape Analysis (Year: 2015).*
Joint Super Resolution and Denoising From a Single Depth Image (Year: 2015).*
Li et al., "Depth Image Quality Assessment for View Synthesis Based on Weighted Edge Similarity", IEEE Xplore, 9 pages.

* cited by examiner

*Primary Examiner* — Nizar N Sivji
(74) *Attorney, Agent, or Firm* — McDonnell Boehnen Hulbert & Berghoff LLP

(57) ABSTRACT

Methods are provided to determine a quality score for depth map. The quality score is calculated from metrics that detect artifacts or other inaccuracies in the depth map such as flat patches, artifactual edges, and patchy regions. A flatness metric detects regions of neighboring pixels that have substantially the same depth value. A jaggedness metric detects hard edges or other discontinuities. A patchiness metric detects regions that are wholly enclosed by an edge and that have sub-threshold areas. The individual metrics are normalized and combined to determine an overall quality score for the depth map. The quality score can then be compared to one or more thresholds to determine a quality label for the depth map. Such a quality label can then be used to unlock a device, to invalidate an unlock attempt, to recalibrate a depth sensor, or to perform some other operations.

20 Claims, 5 Drawing Sheets

240

250

220

230

200

210

340

350

320

330

300

310

MEASURING QUALITY OF DEPTH IMAGES IN REAL TIME

BACKGROUND

A depth map of an image may describe the depth of objects and/or regions within the image. A depth map may be used to determine the shape and/or contours of a surface of an object. Such depth information may be used for a variety of applications, e.g., recognizing a user based on the shape of the user's face and, in response to detecting the user's face, unlocking a device or system. Accordingly, it can be beneficial for the depth map to be accurate in illustrating the shape and/or contours of a particular object.

SUMMARY

Depth maps can be determined from a single image, or from multiple images, via a variety of methods. In one example, a single image can be applied to an artificial neural network (ANN) or other algorithms to generate the depth map, e.g., based on visual cues present within the image. In another example, two (or more) images can be used to determine the depth map by determining correspondences between the contents of the images and then determining depth values for the depth map based on the disparity between the locations of the same content (e.g., object) in the two (or more) images. In yet another example, a depth sensor (e.g., a time-of-flight sensor, an ultrasonic sensor, an infrared camera and pattern light emitter) could be used to generate a depth map directly.

The depth map can then be used to facilitate a variety of applications, e.g., navigation, applying distance-based blurring or other filtering to a source image, or other applications. In some applications, depth maps may be used to identify subjects in the image. The depth maps may be used to determine the shape and contours of the surfaces of subjects and use that information to identify the objects and/or subjects. This can include identifying the face of an authorized user of a device or system. In these cases, it may be beneficial that the generated depth map have high accuracy so as to improve the outcome of these applications.

In practice, a variety of factors may cause a generated depth map to include inaccuracies. For example, lighting, obstructions, or shadows in the environment of the subject could result in generation of an inaccurate depth map. The subject itself could cause such inaccuracies, e.g., by moving or changing orientation when an image is captured, and/or by being oriented in a difficult-to-map way relative to the device capturing the image or other depth information. Further factors causing inaccuracies can include the device that generated the depth map being inadequately calibrated.

Inaccuracies in a depth map may manifest in various ways in the depth map. In some examples, inaccuracies may manifest as one or more flat regions in the depth map instead of a gradient or other varying region. In some examples, inaccuracies may manifest as edges or other discontinuities where there are not edges in the image or where the image is relatively smooth. In some examples, inaccuracies may appear as sharper or more distorted edges where the edges should be smoother. In some examples, inaccuracies may manifest as one or more gradient regions comprising gradient values that are inconsistent with the depth map. It is beneficial in a variety of applications to detect and/or quantify such inaccuracies that may be present in the depth map. Such detection and/or quantification can then be used to determine an overall quality of a depth map. This "quality metric" can then be used by users and/or systems to take appropriate action based on the depth map, e.g., to re-generate and/or reject a depth map that is determined to be low quality (e.g., likely to contain inaccurate flat regions, edges, and/or patchy regions).

The methods disclosed herein allow depth maps to be analyzed for inaccuracies such as flatness, jaggedness, and patchiness. This analysis includes determining a quantity of pixels of the depth map that are "flat," "edges," and/or "patchy." Based on the quantity of pixels that are inaccurate in one or more of these ways, a score can be calculated to determine the overall quality of the depth map. Such a calculated quality score can be used in a variety of ways, e.g., can be compared to one or more thresholds to assign a quality label to the depth map. Based on the determined quality label, an action may be taken. For example, if a depth map is determined to have a sufficiently low quality, a calibration process may be performed to prevent future depth maps from containing such inaccuracies.

In a first aspect, a method includes: (i) obtaining a depth map image; (ii) calculating a flatness metric of the depth map image, wherein the flatness metric represents an amount of the depth map that is locally flat; (iii) calculating a jaggedness metric of the depth map image, wherein the jaggedness metric represents an amount of the depth map that is proximate to discontinuities in the depth map; (iv) normalizing the flatness metric and the jaggedness metric; (v) calculating a quality score for the depth map image based on the normalized flatness metric and the normalized jaggedness metric; and (vi) determining, based on the quality score, a quality label for the depth map image, wherein the quality label is selected from an enumerated set of labels.

The above method may include one or more of the following optional features. The above method may further comprise obtaining a weight mask that comprises a two dimensional Gaussian distribution, wherein calculating the flatness metric comprises applying the weight mask to the depth map image such that locally flat regions proximate to an edge of the depth map image have less effect on the flatness metric than locally flat regions proximate to the center of the depth map image. The above method may further include obtaining a weight mask that comprises a two dimensional Gaussian distribution, wherein calculating the jaggedness metric comprises applying the weight mask to the depth map image such that discontinuities that are proximate to an edge of the depth map image have less effect on the jaggedness metric than discontinuities that are proximate to the center of the depth map image. Calculating the flatness metric may comprise identifying pixels of the depth map image that have a same depth value as at least a threshold amount of nearby pixels. Calculating the jaggedness metric may comprise applying an edge detector to identify pixels of the depth map image that are edge pixels. The above method may further comprise calculating a patchiness metric of the depth map image, wherein the patchiness metric represents an amount of the depth map image that is within sub-threshold patches of the depth map image, wherein sub-threshold patches of the depth map image are regions of the depth map image that are fully enclosed within edges of the depth map image and that have an area less than a threshold area. Calculating the patchiness metric may comprise identifying a sub-threshold patch by: (i) applying an edge detector to identify edges within the depth map image, wherein calculating the jaggedness metric comprises determining a number of pixels of the depth map that are proximate to the identified edges; (ii) determining that a particular region of the depth map image is fully enclosed by the identified edges; and (iii) determining that the particular region of the depth map image has an area that is less than a threshold area.

Calculating a quality score of the depth map image may comprise calculating an L2 norm of a vector that includes the normalized flatness metric and the normalized jaggedness metric. Determining the quality label for the depth map image may comprises comparing the quality to one or more predefined thresholds. The enumerated set of labels may contain at least one of a high quality label, a medium quality label, or a low quality label.

Obtaining the depth map image may comprise operating a depth sensor to generate the depth map image. Determining a quality label for the depth map image may comprise determining a low quality label or a medium quality label for the depth map image, and wherein the method further may comprise, in response to determining the low quality label or the medium quality label for the depth map image, providing a prompt to a user to perform a calibration procedure on the depth sensor. Determining a quality label for the depth map image may comprise determining a low quality label or a medium quality label for the depth map image, and wherein the method further may comprise, in response to determining the low quality label or the medium quality label for the depth map image, running a calibration procedure on the depth sensor.

The depth map image may represent a human face, and the above method may further comprise identifying the human face based on the depth map image. The method may further comprise, based on the identified human face, unlocking at least one device associated with the depth sensor. Determining a quality label for the depth map image may comprise determining a high quality label for the depth map image, and the method may further comprise, in response to (i) determining the high quality label for the depth map image and (ii) identifying the human face, unlocking at least one device associated with the depth sensor.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
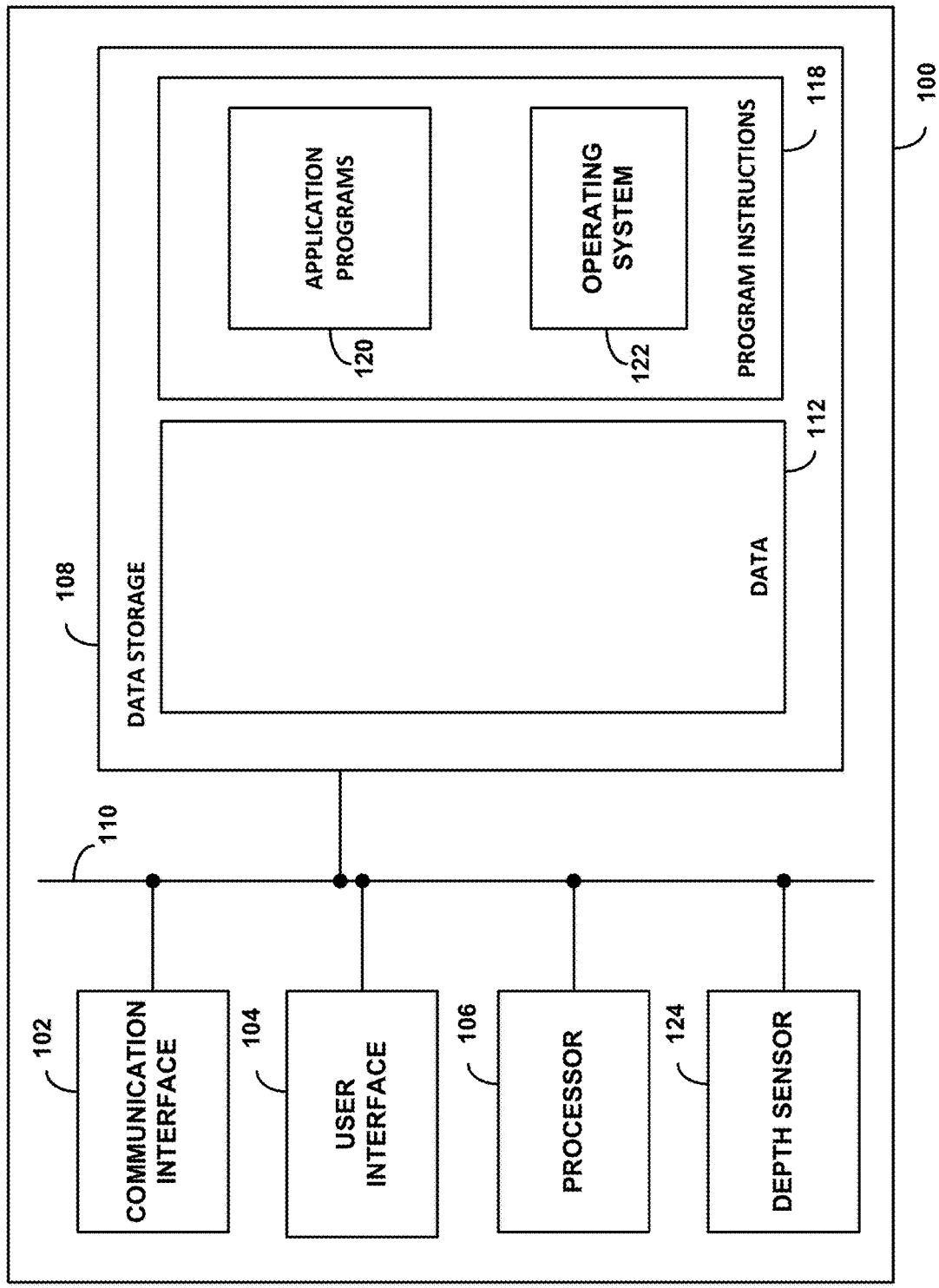
FIG. 1 is a simplified block diagram showing some of the components of an example computing system.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. EXAMPLE DEPTH MAPS AND APPLICATIONS THEREOF

Generally, imaging may refer to capturing and storing the color and brightness characteristics of a real-world environment or scene in a digital, chemical, or other format (e.g., in photographs and/or motion video). A large variety of image capture devices exist (e.g. CCDs, photodetector arrays, active pixel sensors) to facilitate capturing images in a host of different formats (e.g., color imaging, black and white imaging).

It can be advantageous in a variety of applications to determine the depth of objects present in such an image, or to determine depth information for an environment that has not been imaged. Such a depth map could include a depth value for each location within an image, e.g., for each pixel of the image. Depth values of such a depth map could be related to the location of objects that are depicted in the image relative to each other, the distance between such objects and a camera or other sensing device used to generate the image, or to some other depth-related parameter of objects or locations represented within the image. For example, an image could depict an outdoor scene and a depth map determined for the image could describe the distance between objects and/or locations in the scene and a camera used to capture the image. Additionally or alternatively, a depth sensor (e.g., an ultrasonic depth sensor, a time-of-flight sensor, an infrared image sensor operated in combination with a patterned light source) could be operated to generate depth map information for a scene directly, rather than based on one or more visible-light images of the scene.

Such a depth map could then be used to determine the shape and location of objects within the scene (e.g., to map the objects and locations present in the scene, to navigate a robot or other device through the scene), to perform depth-aware image processing or some other image processing on the image (e.g., to blur objects at certain depths within the scene in order to simulate a shallow depth-of-field image), or to facilitate some other applications. For example, an image could depict a close frame of a human face and a depth map for the image could describe the contours, features, location, and orientation of the face. Such a depth map could then be used to determine if the image is adequately capturing the whole human face, to identify the human whose face is represented in the image and depth map, to verify or validate an identification of the human based on the image and/or the depth map, or to facilitate some other applications. Using a face image and corresponding depth map can provide a variety of benefits with respect to facial recognition, e.g., to improve the rejection of false-positive identifications, to prevent ID spoofing (e.g., spoofing the ID system by placing a flat image of an authorized user in front of an image sensor), to allow for the implementation of a postural 'password' whereby the user has to assume a set pose or expression to unlock a device, or other benefits.

II. EXAMPLE SYSTEMS

Computational functions (e.g., functions to generate a depth map and/or to generate a quality score for a depth map) described herein may be performed by one or more computing systems. Such a computing system may be integrated into or take the form of a computing device, such as a mobile phone, tablet computer, laptop computer, server, cloud computing network, and/or programmable logic controller. For purposes of example, FIG. 1 is a simplified block diagram showing some of the components of an example computing device 100 that may include a depth sensor 124. Depth sensor 124 may operate to generate depth information for a scene based on image information for the scene, e.g., based on a stereoscopic image pair taken of the scene. In such examples, the depth sensor 124 may include one or more cameras, such as visible light cameras, infrared cameras, light field cameras, plenoptic cameras, or other types of cameras. Images of a scene generated by such a depth sensor may be used for other applications, as well, e.g., to image the scene, to identify contents of the scene, etc. Additionally or alternatively, the depth sensor 124 could include ultrasonic distance sensing components, time-of-flight sensors, patterned illumination projectors, or other elements configured to more directly measure depth values for contents of the scene.

By way of example and without limitation, computing device 100 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, a robot, a drone, an autonomous vehicle, or some other type of device. Such a device may be equipped with an image capture device so as to generate one or more images that may then be used in combination with a depth map as described herein (e.g., to identify an authorized user, to detect spoofing of a camera or other visual user identification method). It should be understood that computing device 100 may represent a physical device such as a digital camera or cell phone, a particular physical hardware platform on which depth map processing application operates in software, or other combinations of hardware and software that are configured to carry out depth map quality score determination functions.

As shown in FIG. 1, computing device 100 may include a communication interface 102, a user interface 104, a processor 106, and data storage 108, and depth sensor 124, all of which may be communicatively linked together by a system bus, network, or other connection mechanism 110.

Communication interface 102 may function to allow computing device 100 to communicate, using analog or digital modulation of electric, magnetic, electromagnetic, optical, or other signals, with other devices, access networks, and/or transport networks. Thus, communication interface 102 may facilitate circuit-switched and/or packet-switched communication, such as plain old telephone service (POTS) communication and/or Internet protocol (IP) or other packetized communication. For instance, communication interface 102 may include a chipset and antenna arranged for wireless communication with a radio access network or an access point. Also, communication interface 102 may take the form of or include a wireline interface, such as an Ethernet, Universal Serial Bus (USB), or High-Definition Multimedia Interface (HDMI) port. Communication interface 102 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 102. Furthermore, communication interface 102 may comprise multiple physical communication interfaces (e.g., a Wifi interface, a BLUETOOTH® interface, and a wide-area wireless interface).

In some embodiments, communication interface 102 may function to allow computing device 100 to communicate, with other devices, remote servers, access networks, and/or transport networks.

User interface 104 may function to allow computing device 100 to interact with a user, for example to receive input from and/or to provide output to the user. Thus, user interface 104 may include input components such as a keypad, keyboard, touch-sensitive or presence-sensitive panel, computer mouse, trackball, joystick, microphone, and so on. User interface 104 may also include one or more output components such as a display screen which, for example, may be combined with a presence-sensitive panel. The display screen may be based on CRT, LCD, and/or LED technologies, or other technologies now known or later developed. User interface 104 may also be configured to generate audible output(s), via a speaker, speaker jack, audio output port, audio output device, earphones, and/or other similar devices.

In some embodiments, user interface 104 may include a display that serves as a viewfinder for visual device unlocking, still camera, and/or video camera functions supported by computing device 100 (e.g., for functions of depth maps captured using the depth sensor 124). Additionally, user interface 104 may include one or more buttons, switches, knobs, and/or dials. It may be possible that some or all of these buttons, switches, knobs, and/or dials are implemented as functions on a touch- or presence-sensitive panel. User interface 104 may be configured to permit a user to initiate functions or processes described herein, e.g., to generate a depth map and visual light image of an authorized user and to perform processing on the depth map (e.g., to identify the authorized user and, responsive to such authorization, to unlock some feature(s) of the device 100).

Processor 106 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, and merging images, among other applications or functions. Data storage 108 may include one or more volatile and/or non-volatile storage components, such as magnetic, optical, flash, or organic storage, and may be integrated in whole or in part with processor 106. Data storage 108 may include removable and/or non-removable components.

Processor 106 may be capable of executing program instructions 118 (e.g., compiled or non-compiled program logic and/or machine code) stored in data storage 108 to carry out the various functions described herein. Therefore, data storage 108 may include a non-transitory computer-readable medium, having stored thereon program instructions that, upon execution by computing device 100, cause computing device 100 to carry out any of the methods, processes, or functions disclosed in this specification and/or the accompanying drawings. The execution of program instructions 118 by processor 106 may result in processor 106 using data 112.

By way of example, program instructions 118 may include an operating system 122 (e.g., an operating system kernel, device driver(s), and/or other modules) and one or more application programs 120 (e.g., camera functions, depth map functions) installed on computing device 100.

Application programs 120 may communicate with operating system 122 through one or more application programming interfaces (APIs). These APIs may facilitate, for instance, application programs 120 transmitting or receiving information via communication interface 102, receiving and/or displaying information on user interface 104, capturing depth maps using depth sensor 124, and so on.

Application programs 120 may take the form of "apps" that could be downloadable to computing device 100 through one or more online application stores or application markets (via, e.g., the communication interface 102). However, application programs can also be installed on computing device 100 in other ways, such as via a web browser or through a physical interface (e.g., a USB port) of the computing device 100.

III. EXAMPLE DEPTH MAP QUALITY SCORE DETERMINATION

A depth map, whether generated by a depth sensor that measures depth information directly or generated based on one or more images of a scene, may contain artifacts or other inaccuracies. These inaccuracies may include noise (e.g., Gaussian noise) related to imperfections in the processes used to generate the depth map. However, in some cases, a variety of structured artifacts may be present in the depth map. Such structured artifacts may be a result of a particular method or sensor used to generate the depth map. For example, a particular space-filling method for depth map generation may exhibit a propensity toward depth maps that include a number of smooth regions that are separated by edges or other discontinuities. In another example, a particular depth map sensor may, under certain circumstances, be prone to generating depth maps that include artifactually flat regions (e.g., due to thresholding in the presence of noisy image data).

It can be beneficial in a variety of circumstances to have a measure of the quality of a depth map. For example, a quality score for a depth map could be used to determine whether to use the depth map for some purpose (e.g., as part of a user identification process), to discard the depth map and acquire a new depth map, to recalibrate a sensor used to generate the depth map, to discard the depth map and abort a process that was intended to use the depth map, or to take some other action. However, it can be difficult to determine the quality of a depth map when 'ground truth' depth map information is not available for the depth map. In such examples, the presence of one or more of the inaccuracies or artifacts described herein could be used as a proxy for the quality of the depth map, with higher-quality depth maps exhibiting fewer such inaccuracies and to a lesser degree (e.g., spanning a smaller proportion of the area of the depth map). Thus, the presence and degree of such inaccuracies in a depth map could be determined and used to generate an overall quality score for the depth map. This could include determining the presence and degree of more than one type of inaccuracy and then combining metrics determined for each of the inaccuracies into a single quality score.

One type of inaccuracy or artifact that may be present in a depth map is a region of pixels that have the same, or substantially the same, depth value instead of varying as would be expected in an accurate depth map. This may be referred to as a "flat" region as such a region artifactually depicts a flat surface. Large flat regions in a depth map may also be the result of the subject of the depth map being off-centered in the image or the result of some other circumstance.

The location and extent of such flat regions within a depth map can be determined in a variety of ways. This can include determining whether each pixel of the depth map is included within a flat region. Such determined location and extent information can then be used to determine a flatness metric for the depth map, e.g., by determining a number or proportion of the pixels of the depth map that are 'flat' pixels. Determining whether a pixel is a 'flat' pixel can include applying a metric to the pixels of the depth map to detect flat regions. In some embodiments, the metric may be defined by thresholding the magnitude (e.g., <0.0005) of the gradient of the image. Such gradient information can be blurred or otherwise processed prior to applying the threshold, e.g., using a Gaussian blur function blur ($\sqrt{dx^2+dy^2}$) where dx and dy are the outputs of the Sobel operator applied to the pixels of the depth map. Pixels that result in a gradient magnitude lower than the threshold may be marked as 'flat.' The total amount of flat-marked pixels may be used as the flatness metric of the depth map. Other algorithms and/or metrics may be used to detect flat regions and to calculate a score that reflects the quality of the depth map in regards to flatness.

Figure 2:
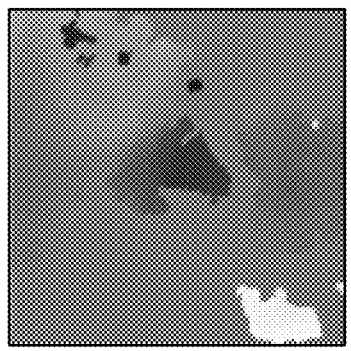
FIG. 2 illustrates example depth maps and analysis thereof.
Figure 2:
Figure 2:
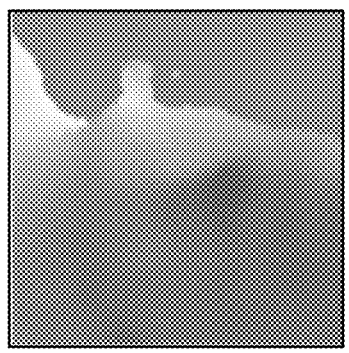
Figure 2:
Figure 2:
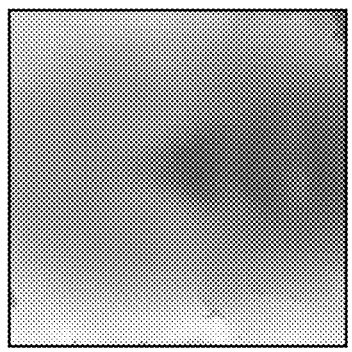
Figure 2:
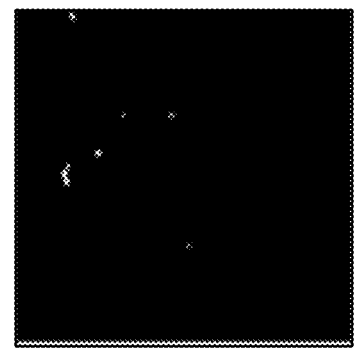

FIG. 2 depicts examples of depth maps that include such "flat" regions and their respective flat region metric maps. The depth maps vary in quality in regard to the amount of flat regions within them. The metric map illustrates the pixels identified as being a part of a flat region. In the metric maps shown in FIG. 2, the flat region pixels are colored white while the other pixels are colored black. The depth maps were generated from images of human faces.

Depth map 200 is an example of a high or good quality generated depth map in regard to flatness. In this example, the human face is centered in the depth map, key features (e.g., the eyes and nose) are visible, and the depth gradient is almost completely smooth. Metric map 210 reflects this as there is a low amount of white pixels.

Depth map 220 is an example of a medium or moderate quality generated depth map in regard to flatness. In this example, the human face is off-center to the left side of the map, most of the key features are visible, and the depth gradient is mostly completely smooth. Metric map 230 reflects this as there is a large region of white pixels on the right side of the map and a few small regions of white pixels on the left side of the map.

Depth map 240 is an example of a low or poor quality generated depth map in regard to flatness. In this example, the human face is barely recognizable as the gradient is mostly broken up by a region of flatness. Metric map 250 reflects this as there is a large region of white pixels that divides the black smooth-gradient regions.

Another type of inaccuracy or artifact that may be present in a depth map are edges or other discontinuous boundaries between regions of the depth map that, while present in the depth map, do not correspond to edges in the scene represented by the depth map. Such artifactual edges manifest as edges that are sharper, more jagged, or otherwise rougher than 'true' edges in the depth map. Pixels of the depth map that are proximate to such edges may be referred to as "edge" pixels. Edges that are jagged may increase the amount of such "edge" pixels in a depth map. Regions of a depth map that contain jagged or otherwise artifactual edges are likely inaccurate, and so their presence corresponds to low-quality depth maps. Jagged or otherwise artifactual edges may be the result of the subject not being oriented toward the camera or other sensor used to generate an image and/or depth map.

A higher quality depth map is likely to be generally smooth with a low amount of non-jagged edges. The location and extent of edges (e.g., of especially abrupt, jagged, or otherwise likely to be artifactual edges) within a depth map can be determined in a variety of ways. Such determined location and extent information can then be used to determine a jaggedness metric for the depth map, e.g., by determining a number or proportion of the pixels of the depth map that are 'edge' pixels. Determining whether a pixel is an 'edge' pixel can include applying a metric or other method to the pixels of the depth map to detect jagged edges. In some embodiments, the jaggedness metric may be determined as the count of edge pixels identified using a Canny edge detector or some other edge detection method. For example, a Canny edge detector could be applied having an upper threshold set to 150 and a lower threshold set to 50. The total amount of edge pixels may be used as the jaggedness score of the depth map. Other algorithms and/or metrics may be used to detect jagged edges and calculate a score that reflects the quality of the depth map in regards to jaggedness.

Figure 3:
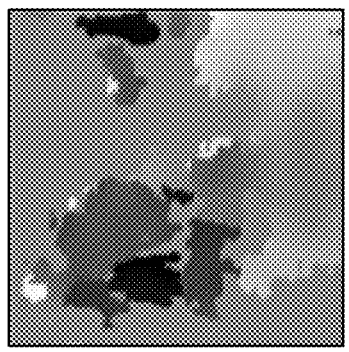
FIG. 3 illustrates example depth maps and analysis thereof.
Figure 3:
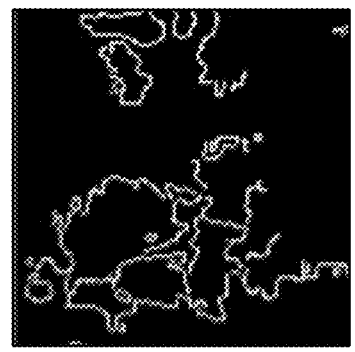
Figure 3:
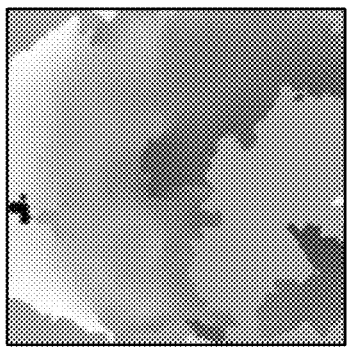
Figure 3:
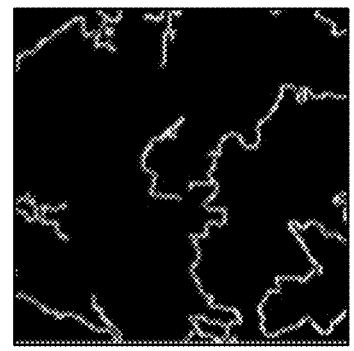
Figure 3:
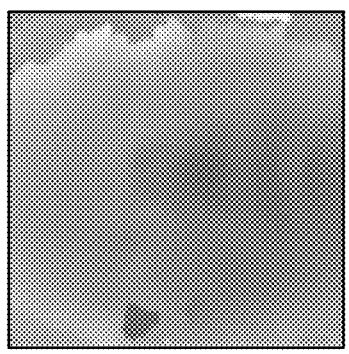
Figure 3:

FIG. 3 depicts examples of depth maps that include such jagged edges and their respective jagged edge metric maps. The depth maps vary in quality in regard to the amount of jagged edges present in them. The metric map illustrates the pixels identified of being a part of a jagged edge. In the metric maps shown in FIG. 3, the jagged edge pixels are colored white while the other pixels are colored black. The depth maps were generated from images of human faces.

Depth map 300 is an example of a high or good quality generated depth map in regard to jagged edges. In this example, the human face is mostly centered in the depth map, the key features are visible, and the depth gradient is almost completely smooth other than the edge on the right side. Metric map 310 reflects this as there is a long edge of white pixels along the right side and a small edge of white pixels on the left side.

Depth map 320 is an example of a medium or moderate quality generated depth map in regard to jagged edges. In this example, the human face is mostly centered in the depth map, the key features are jagged or obscured, and most of the edges are jagged. Metric map 330 reflects this as there are white edges outlining the vaguely face-shaped region.

Depth map 340 is an example of a low or poor quality generated depth map in regard to jaggedness. In this example, the human face isn't recognizable as the gradient is mostly made up of patches and a large flat region. Metric map 350 reflects this as there are white jagged edges making up several separate regions that do know resemble the oval face shape.

Another type of inaccuracy or artifact that may be present in a depth map is regions containing a plurality of small "patches" that are fully enclosed by edges but that do not have large areas. Such patchy regions may be the result of similar factors as cause artifactually flat regions, however, a flatness metric may not detect them because of the gradients of the enclosing edges.

The location and extent of such patchy regions within a depth map can be determined in a variety of ways. This can include locating individual patches by identifying regions of the depth map that are fully enclosed within an identified edge and that have areas less than a threshold area. Such determined location and extent information can then be used to determine a patchiness metric for the depth map, e.g., by determining a number or proportion of the pixels of the depth map that are 'patchy' pixels. Determining whether a pixel is a 'patchy' pixel can include applying determining whether the pixel is part of an edge-enclosed region of sub-threshold area. This information can then be used to determine a metric for the depth image that may be referred to as a "patchiness" metric. The area threshold may be set such that it only detects patches that are likely to represent inaccurate or otherwise artifactual areas of the depth map and not areas of the depth map that are likely to contain accurate data. If used in combination with a flatness metric, the patchiness metric may be computed to prevent overcounting regions as "patchy" that are also marked as "flat" regions (e.g., by only counting enclosed regions that are also not flat regions). The resulting area or number of pixels in the patches may be used as a patchiness score for the depth map. Other algorithms and/or metrics may be used to detect patches and calculate a score that reflects the quality of the depth map in regard to patchiness.

Figure 4:
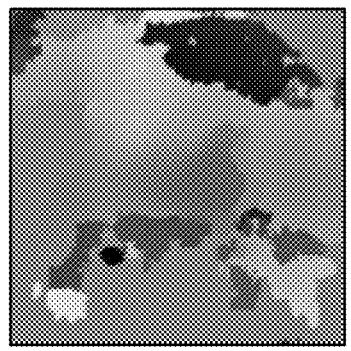
FIG. 4 illustrates example depth maps and analysis thereof.
Figure 4:
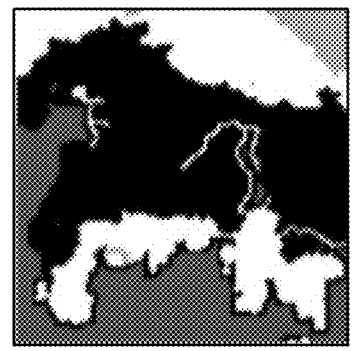
Figure 4:
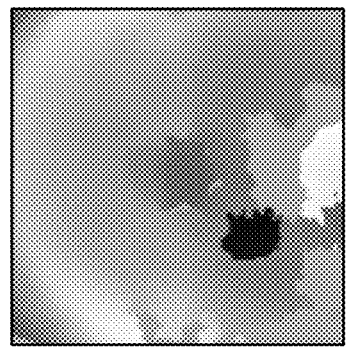
Figure 4:
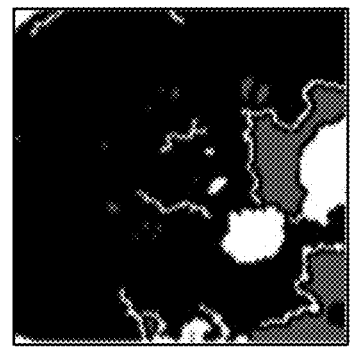
Figure 4:
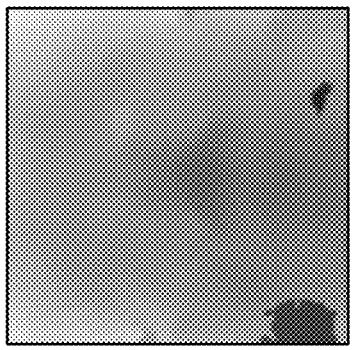
Figure 4:

FIG. 4 depicts examples of depth maps that include such 'patchy' regions and their respective patchiness metric maps. The depth maps vary in quality, in regard to the amount of the depth maps that are patchy. The metric map illustrates the pixels identified from the metric of being a part of a flat region and/or a patchy region. In the metric maps shown in FIG. 4, regions that are identified as a patch are colored white, regions that are identified as both a patch and flat are colored light gray, regions that are only identified as flat are colored dark gray, and the rest are colored black. The depth maps are generated from images of human faces.

Depth map 400 is an example of a high or good quality generated depth map in regard to patchiness. In this example, the human face is mostly centered in the depth map, the key features like the nose and eyes are visible, and the depth gradient is almost completely smooth other than a few small regions, including an inaccurate gradient patch on the lower left. Metric map 410 reflects this as it includes a few small light gray regions and a large white region in the lower left.

Depth map 420 is an example of a medium or moderate quality generated depth map in regard to patchiness. In this example, the human face is mostly centered in the depth map, but tilted away from the frame, the key features are jagged or obscured, and there are a few flat regions and gradient patches present. Metric map 430 reflects this as there are multiple light gray and white regions present.

Depth map 440 is an example of a low or poor quality generated depth map in regard to flatness. In this example, the human face barely recognizable as the depth map is covered by many flat regions and gradient patches. Metric map 450 reflects this as there are large white and light gray regions that make up the majority of the metric map.

In some embodiments, a weighted heuristic may be applied to the pixels of the depth map. This may be done in order to emphasize the relative importance of certain pixels within the depth map to a particular application. This weighting can be applied such that pixels having higher weights have greater effects on the determined metrics (e.g., the flatness, jaggedness, and/or patchiness metric) and on the overall quality scores determined therefrom. In the example of facial recognition, pixels towards the center of the depth map may be weighted higher than pixels on the edges since the face is more likely to be centered and take up most the frame. In example embodiments, the weighting may be a two-dimensional (2D) Gaussian distribution. Other weighted heuristics may be used instead of or in addition to the Gaussian distribution.

An overall depth map quality score may be calculated using a combination of the calculated metric scores. In some embodiments, only one or two of the flatness, jaggedness, and patchiness metrics may be used in calculating the final quality score. The metric scores may be normalized before calculating the overall depth map quality score. In some embodiments, the overall depth map quality score may be generated by calculating an L2 norm of a vector of the flatness, jaggedness, and/or patchiness metrics. In further embodiments, the depth map may be labeled with a quality label by comparing the quality score to one or more predefined thresholds. For example, if the quality score is higher than a set threshold, the depth map may be labeled as being low or poor quality. The quality labels may include one associated with high or good quality, one associated with medium or moderate quality, and one associated with low or poor quality.

In some embodiments, actions may be taken based on the resulting overall depth map quality score. For example, when a depth map is determined to have low quality, this may cause a recalibration of the device that generated the depth map and/or recalibration of a device that captured the original image used to generate the depth map. In some embodiments, when a depth map is determined to have mediocre quality, an associated computational system may notify a user that the depth map generation device may need recalibration. In some embodiments, the depth map quality algorithm may be used on a plurality of depth maps that may be used, with their resulting quality labels, as training and/or testing data for a machine learning model and/or artificial neural network. The actions taken may be specific to the application the depth map is being used for. In some examples, the depth map may be used for facial recognition where the contours of the face may be identified using the depth map. Such a facial recognition process may be used by a mobile device. In these facial recognition examples, if a depth map is determined to have poor quality (e.g., a quality score lower than a certain threshold), the mobile device may run a recalibration automatically or prompt the user to execute a recalibration.

IV. EXAMPLE METHODS

Figure 5:
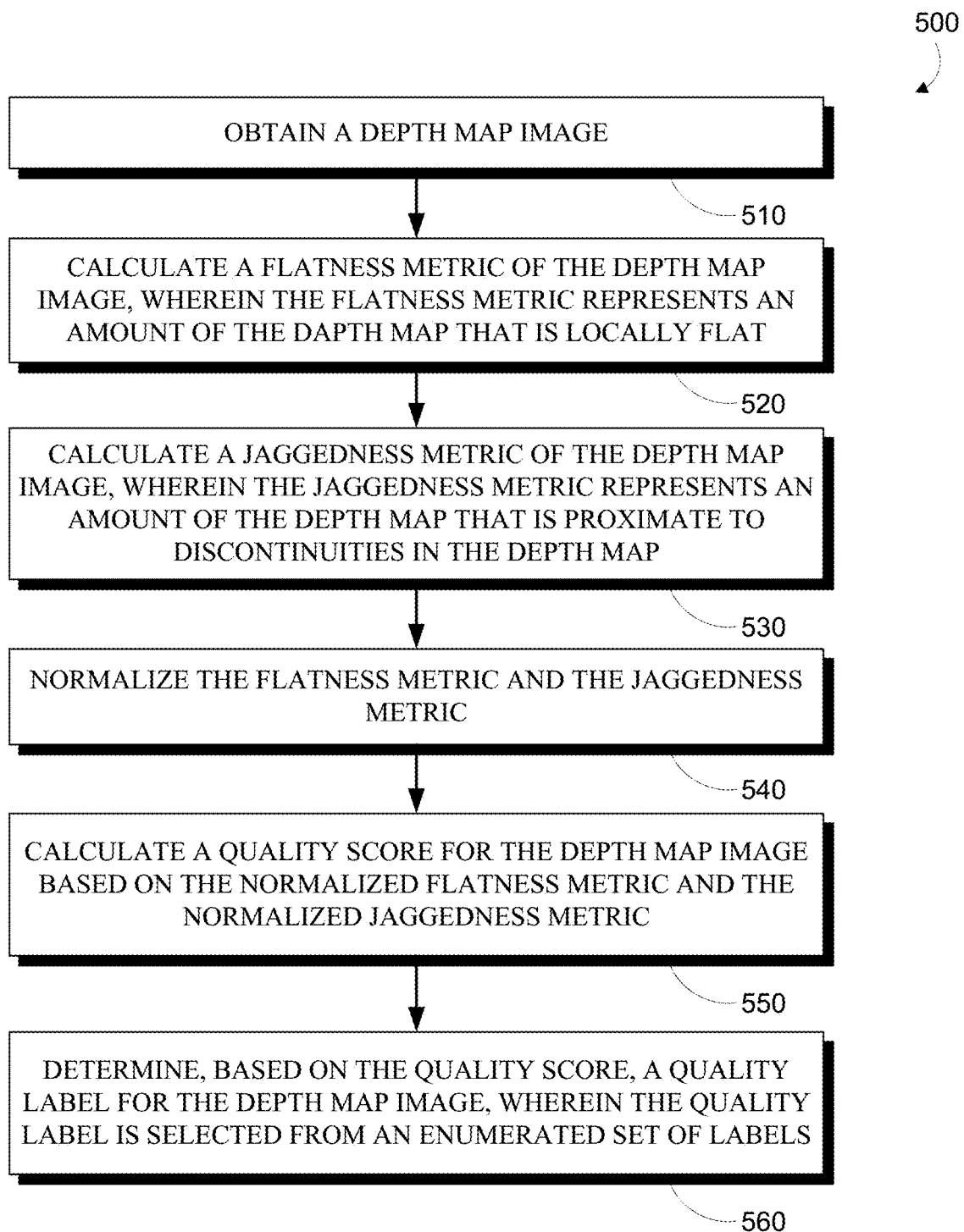
FIG. 5 is a flowchart of an example method.

FIG. 5 is a flowchart of a method 500 for determining a quality score for a generated depth map of an image. The method 300 includes obtaining a depth map image (510). The method 500 additionally includes calculating a flatness metric of the depth map image, wherein the flatness metric represents an amount of the depth map that is locally flat (520). The method 500 additionally includes calculating a jaggedness metric of the depth map image, wherein the jaggedness metric represents an amount of the depth map that is proximate to discontinuities in the depth map (530). The method 500 additionally includes normalizing the flatness metric and the jaggedness metric (540). The method 500 additionally includes calculating a quality score for the depth map image based on the normalized flatness metric and the normalized jaggedness metric (550). The method 500 additionally includes determining, based on the quality score, a quality label for the depth map image, wherein the quality label is selected from an enumerated set of labels (560).

These embodiments could include additional elements or features. In some embodiments, the method further includes obtaining a weight mask that comprises a two dimensional Gaussian distribution (e.g., by generating the weight mask according to a formula or by retrieving a representation of the weight map from a data storage). Calculating the flatness metric in such embodiments can include applying the weight mask to the depth map image such that locally flat regions proximate to an edge of the depth map image have less effect on the flatness metric than locally flat regions proximate to the center of the depth map image. Additionally or alternatively, calculating the jaggedness metric in such embodiments can include applying the weight mask to the depth map image such that discontinuities that are proximate to an edge of the depth map image have less effect on the jaggedness metric than discontinuities that are proximate to the center of the depth map image.

In some embodiments, calculating the flatness metric comprises identifying pixels of the depth map image that have the same depth value as at least a threshold amount of nearby pixels. In some embodiments, calculating the jaggedness metric comprises applying an edge detector to identify pixels of the depth map image that are edge pixels. In some embodiments, the method further includes calculating a patchiness metric of the depth map image, wherein the patchiness metric represents an amount of the depth map image that is within sub-threshold patches of the depth map image, wherein sub-threshold patches of the depth map image are regions of the depth map image that are fully enclosed within edges of the depth map image and that have an area less than a threshold area. In further embodiments, calculating the patchiness metric comprises identifying a sub-threshold patch by: (i) applying an edge detector to identify edges within the depth map image, wherein calculating the jaggedness metric comprises determining a number of pixels of the depth map that are proximate to the identified edges; (ii) determining that a particular region of the depth map image is fully enclosed by the identified edges; and (iii) determining that the particular region of the depth map image has an area that is less than a threshold area.

In some embodiments, calculating a quality score of the depth map image comprises calculating an L2 norm of a vector that includes the normalized flatness metric and the normalized jaggedness metric. In some embodiments, determining the quality label for the depth map image comprises comparing the quality to one or more predefined thresholds. In further embodiments, the enumerated set of labels contains at least one of a high quality label, a mediocre quality label, or a low quality label.

In some embodiments, obtaining the depth map image comprises operating a depth sensor to generate the depth map image. In further embodiments, determining a quality label for the depth map image comprises determining a low quality label or a mediocre quality label for the depth map image, and the method further comprises, in response to determining the low quality label or the mediocre quality label for the depth map image, providing a prompt to a user to perform a calibration procedure on the depth sensor. In some embodiments, determining a quality label for the depth map image comprises determining a low quality label or a mediocre quality label for the depth map image, and the method further comprises, in response to determining the low quality label or the mediocre quality label for the depth map image, running a calibration procedure on the depth sensor.

In some embodiments, the depth map image represents a human face, and the method further comprises identifying the human face based on the depth map image. In further embodiments, the method further includes, based on the identified human face, unlocking at least one device associated with the depth sensor. In some embodiments, determining a quality label for the depth map image comprises determining a high quality label for the depth map image, and the method further comprises, in response to (i) determining the high quality label for the depth map image and (ii) identifying the human face, unlocking at least one device associated with the depth sensor.

V. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
   obtaining a depth map image;
   calculating a flatness metric of the depth map image, wherein the flatness metric represents an amount of the depth map that is locally flat;
   calculating a jaggedness metric of the depth map image, wherein the jaggedness metric represents an amount of the depth map that is proximate to discontinuities in the depth map;
   normalizing the flatness metric and the jaggedness metric;
   calculating a quality score for the depth map image based on the normalized flatness metric and the normalized jaggedness metric; and
   determining, based on the quality score, a quality label for the depth map image, wherein the quality label is selected from an enumerated set of labels.

2. The method of claim 1, further comprising:
   obtaining a weight mask that comprises a two dimensional Gaussian distribution, wherein calculating the flatness metric comprises applying the weight mask to the depth map image such that locally flat regions proximate to an edge of the depth map image have less effect on the flatness metric than locally flat regions proximate to the center of the depth map image.

3. The method of claim 1, further comprising:
   obtaining a weight mask that comprises a two dimensional Gaussian distribution, wherein calculating the jaggedness metric comprises applying the weight mask to the depth map image such that discontinuities that are proximate to an edge of the depth map image have less effect on the jaggedness metric than discontinuities that are proximate to the center of the depth map image.

4. The method of claim 1, wherein calculating the flatness metric comprises identifying pixels of the depth map image that have a same depth value as at least a threshold amount of nearby pixels.

5. The method of claim 1, wherein calculating the jaggedness metric comprises applying an edge detector to identify pixels of the depth map image that are edge pixels.

6. The method of claim 1, further comprising:
   calculating a patchiness metric of the depth map image, wherein the patchiness metric represents an amount of the depth map image that is within sub-threshold patches of the depth map image, wherein sub-threshold patches of the depth map image are regions of the depth map image that are fully enclosed within edges of the depth map image and that have an area less than a threshold area; and
   normalizing the patchiness metric, wherein calculating the quality score for the depth map image comprises calculating the quality score for the depth map image based on the normalized flatness metric, the normalized jaggedness metric, and the normalized patchiness metric.

7. The method of claim 6, wherein calculating the patchiness metric comprises identifying a sub-threshold patch by:
applying an edge detector to identify edges within the depth map image, wherein calculating the jaggedness metric comprises determining a number of pixels of the depth map that are proximate to the identified edges;
determining that a particular region of the depth map image is fully enclosed by the identified edges; and
determining that the particular region of the depth map image has an area that is less than a threshold area.

8. The method of claim 1, wherein calculating a quality score of the depth map image comprises calculating an L2 norm of a vector that includes the normalized flatness metric and the normalized jaggedness metric.

9. The method of claim 1, wherein determining the quality label for the depth map image comprises comparing the quality to one or more predefined thresholds.

10. The method of claim 9, wherein the enumerated set of labels contains at least one of a high quality label, a medium quality label, or a low quality label.

11. The method of claim 1, wherein obtaining the depth map image comprises operating a depth sensor to generate the depth map image.

12. The method of claim 11, wherein determining a quality label for the depth map image comprises determining a low quality label or a medium quality label for the depth map image, and wherein the method further comprises:
in response to determining the low quality label or the medium quality label for the depth map image, providing a prompt to a user to perform a calibration procedure on the depth sensor.

13. The method of claim 11, wherein determining a quality label for the depth map image comprises determining a low quality label or a medium quality label for the depth map image, and wherein the method further comprises:
in response to determining the low quality label or the medium quality label for the depth map image, running a calibration procedure on the depth sensor.

14. The method of claim 1, wherein the depth map image represents a human face, and wherein the method further comprises:
identifying the human face based on the depth map image.

15. The method of claim 14, further comprising:
based on the identified human face, unlocking at least one device associated with a depth sensor that was used to generate the depth map image.

16. The method of claim 14, wherein determining a quality label for the depth map image comprises determining a high quality label for the depth map image, and wherein the method further comprises:
in response to (i) determining the high quality label for the depth map image and (ii) identifying the human face, unlocking at least one device associated with a depth sensor that was used to generate the depth map image.

17. An article of manufacture including a non-transitory computer-readable medium, having stored thereon program instructions that, upon execution by a controller, cause the controller to perform controller operations comprising:
obtaining a depth map image;
calculating a flatness metric of the depth map image, wherein the flatness metric represents an amount of the depth map that is locally flat;
calculating a jaggedness metric of the depth map image, wherein the jaggedness metric represents an amount of the depth map that is proximate to discontinuities in the depth map;
normalizing the flatness metric and the jaggedness metric;
calculating a quality score for the depth map image based on the normalized flatness metric and the normalized jaggedness metric; and
determining, based on the quality score, a quality label for the depth map image, wherein the quality label is selected from an enumerated set of labels.

18. The article of manufacture including a non-transitory computer-readable medium of claim 17, the controller operations further comprising:
calculating a patchiness metric of the depth map image, wherein the patchiness metric represents an amount of the depth map image that is within sub-threshold patches of the depth map image, wherein sub-threshold patches of the depth map image are regions of the depth map image that are fully enclosed within edges of the depth map image and that have an area less than a threshold area; and
normalizing the patchiness metric, wherein calculating the quality score for the depth map image comprises calculating the quality score for the depth map image based on the normalized flatness metric, the normalized jaggedness metric, and the normalized patchiness metric.

19. A system comprising:
a controller; and
a non-transitory computer-readable medium, having stored thereon program instructions that, upon execution by the controller, cause the controller to perform controller operations comprising:
obtaining a depth map image;
calculating a flatness metric of the depth map image, wherein the flatness metric represents an amount of the depth map that is locally flat;
calculating a jaggedness metric of the depth map image, wherein the jaggedness metric represents an amount of the depth map that is proximate to discontinuities in the depth map;
normalizing the flatness metric and the jaggedness metric;
calculating a quality score for the depth map image based on the normalized flatness metric and the normalized jaggedness metric; and
determining, based on the quality score, a quality label for the depth map image, wherein the quality label is selected from an enumerated set of labels.

20. The system of claim 19, the controller operations further comprising:
calculating a patchiness metric of the depth map image, wherein the patchiness metric represents an amount of the depth map image that is within sub-threshold patches of the depth map image, wherein sub-threshold patches of the depth map image are regions of the depth map image that are fully enclosed within edges of the depth map image and that have an area less than a threshold area; and
normalizing the patchiness metric, wherein calculating the quality score for the depth map image comprises calculating the quality score for the depth map image based on the normalized flatness metric, the normalized jaggedness metric, and the normalized patchiness metric.

* * * * *